US011639235B2

(12) United States Patent
Courbun et al.

(10) Patent No.: US 11,639,235 B2
(45) Date of Patent: May 2, 2023

(54) HUMAN-MACHINE INTERFACE OF AN AIRCRAFT IN TAKE-OFF OR LANDING PHASE

(71) Applicant: Airbus (S.A.S.), Blagnac (FR)

(72) Inventors: Francois Courbun, Toulouse (FR); Javier Manjon Sanchez, Toulouse (FR)

(73) Assignee: Airbus (S.A.S.), Blagnac (FR)

( * ) Notice: Subject to any disclaimer, the term of this patent is extended or adjusted under 35 U.S.C. 154(b) by 49 days.

(21) Appl. No.: 17/331,823

(22) Filed: May 27, 2021

(65) Prior Publication Data

US 2021/0371125 A1 Dec. 2, 2021

(30) Foreign Application Priority Data

May 29, 2020 (FR) ........................ 2005717

(51) Int. Cl.
| | | |
|---|---|---|
| *B64D 45/08* | (2006.01) | |
| *G06T 7/73* | (2017.01) | |
| *B64D 43/02* | (2006.01) | |
| *B64D 47/08* | (2006.01) | |
| *G06T 11/00* | (2006.01) | |
| *G06T 11/20* | (2006.01) | |
| *G06V 20/13* | (2022.01) | |

(52) U.S. Cl.
CPC ............. *B64D 45/08* (2013.01); *B64D 43/02* (2013.01); *B64D 47/08* (2013.01); *G06T 7/73* (2017.01); *G06T 11/001* (2013.01); *G06T 11/203* (2013.01); *G06V 20/13* (2022.01); *G06T 2207/10032* (2013.01)

(58) Field of Classification Search
CPC ........ B64D 45/08; B64D 43/02; B64D 47/08; B64D 45/04; G06T 7/73; G06T 11/001; G06T 11/203; G06T 2207/10032; G06V 20/13; B64F 1/18; G01C 23/00
See application file for complete search history.

(56) References Cited

U.S. PATENT DOCUMENTS

| | | | |
|---|---|---|---|
| 5,343,395 A | * | 8/1994 | Watts .................. G05D 1/0676 701/538 |
| 5,745,863 A | | 4/1998 | Uhlenhop et al. |
| 6,952,632 B2 | | 10/2005 | Robert et al. |
| 9,377,782 B2 | | 6/2016 | Puyou et al. |

(Continued)

FOREIGN PATENT DOCUMENTS

| | | |
|---|---|---|
| EP | 0776825 A1 | 6/1997 |
| EP | 1335258 A1 | 8/2003 |

(Continued)

*Primary Examiner* — Maurice L. McDowell, Jr.
(74) *Attorney, Agent, or Firm* — KDW Firm PLLC

(57) ABSTRACT

A human-machine interface for displaying an intuitive and accurate graphic representation for assisting in take-off or landing, based on a fully autonomous system essentially using only images captured by embedded cameras and data from avionics systems of the aircraft, the graphic representation including indicators based on a processing of a stream of images taken by embedded cameras and comprising a representation of a runway straight line indicative of the central longitudinal axis of the runway and of at least one deviation indicator representative of the difference between the longitudinal axis of the aircraft and the central longitudinal axis of the runway.

20 Claims, 4 Drawing Sheets

(56) References Cited

U.S. PATENT DOCUMENTS

| | | | |
|---|---|---|---|
| 9,569,668 B2 | 2/2017 | Schertler | |
| 9,766,091 B2 | 9/2017 | Caillaud et al. | |
| 9,939,818 B2 | 4/2018 | Boada-Bauxell et al. | |
| 10,358,233 B1* | 7/2019 | Tiana | G02B 27/0101 |
| 10,417,920 B2 | 9/2019 | Scacchi et al. | |
| 2003/0132860 A1* | 7/2003 | Feyereisen | G01C 23/00 |
| | | | 340/963 |
| 2013/0127642 A1* | 5/2013 | Maggiore | G08G 5/0021 |
| | | | 340/947 |
| 2013/0138273 A1* | 5/2013 | Koukol | G08G 5/0065 |
| | | | 701/15 |
| 2014/0343766 A1* | 11/2014 | Le Gall | G05D 1/0676 |
| | | | 701/18 |
| 2015/0032299 A1* | 1/2015 | Puyou | B64C 13/16 |
| | | | 701/16 |
| 2015/0371545 A1* | 12/2015 | Gannon | G08G 5/025 |
| | | | 340/972 |
| 2017/0183102 A1* | 6/2017 | Monvoisin | G06T 19/006 |
| 2018/0144646 A1* | 5/2018 | Nitzan | G08G 5/0026 |
| 2018/0203466 A1* | 7/2018 | Chiodini | G01P 3/38 |
| 2019/0347943 A1* | 11/2019 | Pesik | G06V 20/588 |

FOREIGN PATENT DOCUMENTS

| | | |
|---|---|---|
| EP | 2722721 A1 | 4/2014 |
| FR | 2988202 A1 | 9/2013 |
| FR | 3017703 A1 | 8/2015 |
| FR | 3024127 A1 | 1/2016 |
| FR | 3044807 B1 | 11/2017 |
| WO | WO 94/04984 A1 | 3/1994 |
| WO | WO 2007/123559 A2 | 11/2007 |
| WO | WO 2014/075657 A1 | 5/2014 |

* cited by examiner

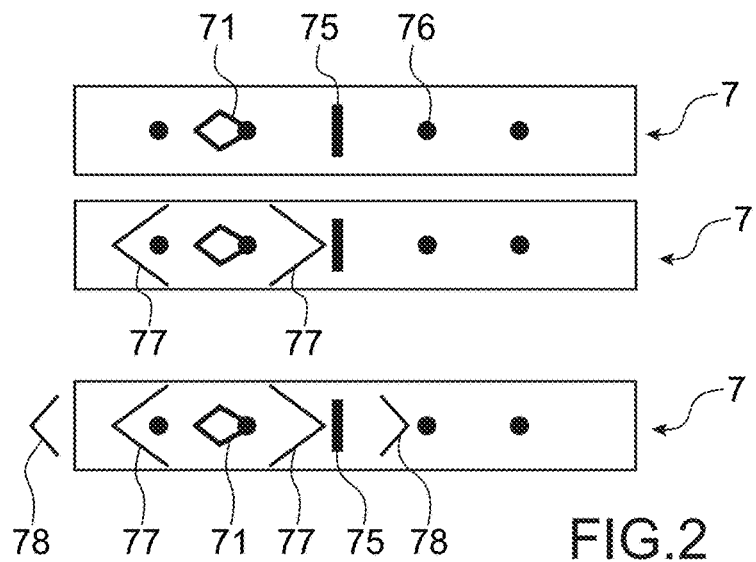
FIG.2
FIG.4A

HUMAN-MACHINE INTERFACE OF AN AIRCRAFT IN TAKE-OFF OR LANDING PHASE

CROSS-REFERENCE TO RELATED APPLICATION

This application claims the benefit of and priority to French patent application number 20 05717 filed on May 29, 2020, the entire disclosure of which is incorporated by reference herein.

TECHNICAL FIELD

The disclosure herein relates generally to the field of aeronautics and, more particularly, that of human-machine interfaces in take-off or landing phase.

BACKGROUND

To simplify the task of the pilots during take-off and landing phases, human-machine interfaces are used that comprise accurate and intuitive indications based on sources of information based on radio signals, satellite positioning and a few images taken by cameras.

Indeed, there are many automatic landing systems. Notably known is the instrument landing system or ILS that equips large-capacity airliners and for which the ground infrastructures are present in international airports. The microwave landing system MLS is also available in some European airports. These systems use radio or microwave signals to guide the aircraft in its approach phase both laterally, with respect to the axis of the runway and vertically with respect to the approach plane (glide path). They do, however, present the drawback of not being available in all airports notably because of their high costs and presenting major usage constraints. The aircraft cannot therefore be sure to be able to perform a landing in automatic mode. More recently, automatic landing systems have emerged that use satellite positioning, called GLS (Ground Landing System) or even SLS (Satellite-based Landing System). The current satellite positioning systems do not make it possible to obtain the accuracy required to perform a landing, so they must be augmented by ground reference stations such as those of the WAAS (Wide Area Augmentation System) or EGNOS (European Geostationary Navigation Overlay Service) network. These systems are even less widely used and have a relatively low availability rate which, here again, does not make it possible to permanently guarantee a landing in automatic mode.

Because of the spatial and temporal unavailability of such ground infrastructures, interest has focused on more autonomous landing systems. In fact, the applications FR3024127 and FR3044807 filed by the present applicant propose landing assistance systems using video images taken by embedded cameras and information relating to the current situation of the aircraft.

SUMMARY

An object of the disclosure herein is to propose a human-machine interface for assisting in piloting not only in landing phase but also in take-off phase while dispensing with the specific ground infrastructures and augmented satellite positioning systems.

The disclosure herein relates to a human-machine interface in an aircraft, intended to display a graphic representation for assisting in the take-off or the landing of the aircraft, the graphic representation comprising indicators based on a processing of a stream of images taken by embedded cameras and on avionics data from avionics systems of the aircraft, the indicators comprising a representation of a runway straight line indicative of the central longitudinal axis of the runway and of at least one deviation indicator, calculated from processing of the stream of images and of the avionics data, representative of the difference between the longitudinal axis of the aircraft and the central longitudinal axis of the runway.

This interface allows for an intuitive and accurate graphic representation for assisting in take-off or in landing based on a completely autonomous system using images captured by cameras and avionics data, thus dispensing with the use of any other sources of information which might be unavailable in certain airports, Thus, this interface does not require specific ground infrastructures, nor does it require augmented satellite positioning systems.

Advantageously, a deviation indicator is represented by a pointer moving along a one-dimensional reference frame whose origin is linked to the position of the aircraft, the position of the pointer indicating the difference between the central longitudinal axis of the runway and the longitudinal axis of the aircraft, and the interface is intended to also represent at least one confidence interval bracketing the measured value of the deviation indicated by the pointer.

Thus, the position of the pointer and the confidence interval accurately indicate the level of alignment of the longitudinal axes of the runway and of the aircraft. Furthermore, this makes it possible, in the case where the confidence level indicated is very low (for example, because of vibration problems affecting the stream of images), to discredit the deviation measurements based on images in favour of another, conventional measurement source, or, possibly, by using a manual (take-off or landing) mode.

Advantageously, the origin of the one-dimensional reference frame is marked by a line of a first color and the pointer is represented by a geometrical figure, such as a rhomb, of a second color distinct from that of the line, the vertical axis of symmetry of the geometrical figure indicating the measured value of the deviation and the length of the segment merged with the horizontal axis of symmetry and linking two points of the geometrical figure representing a first, reference confidence interval associated with one times the standard deviation. The human-machine interface is intended to also represent a second confidence interval associated with two times the standard deviation and represented by bracketing symbols around the geometrical figure and/or a third confidence interval associated with three times the standard deviation and represented by bracketing symbols around the second confidence interval.

Thus, the longitudinal axes of the runway and of the aircraft are considered to be sufficiently aligned when the line is located within the geometrical figure making it possible to indicate that the aircraft is well positioned with respect to the landing trajectory or the take-off axis while indicating the degree of confidence.

Advantageously, the bracketing symbols of the second and third confidence intervals are represented by the same or different forms selected from among the following forms: an opening chevron and a closing chevron, an opening double chevron and a closing double chevron, left and right parentheses, left and right square brackets, etc. The bracketing symbols can be of the same or different colors.

This makes it possible to simply and clearly display the different confidence intervals.

Advantageously, the human-machine interface is intended to issue an alert signal in the case where the deviation is greater than a certain predetermined threshold, the alert signal corresponding to at least one signal from among the following: an audible signal, and/or a blinking of the pointer, and/or a change in the geometrical form of the pointer, and/or a change of the color of the pointer, and/or a written message.

This allows the crew to monitor the behavior of the system in order to take over control in manual piloting mode if necessary.

Advantageously, during a take-off phase, the human-machine interface is intended to also display an image of the runway and an aircraft straight line superimposed on the image of the runway indicative of the longitudinal axis of the aircraft and the remaining distance of the runway, the aircraft and runway straight lines indicative of the longitudinal axes of the aircraft and of the runway are represented by two distinct colors.

This makes it possible to check the alignment between the two axes and the remaining distance gives relevant indications to the crew in the case of braking.

Advantageously, during a take-off phase, the human-machine interface is intended to mark, on the straight line of the runway, first and second markers where the aircraft has planned to reach first and second characteristic speeds, the first speed representing the speed of decision to continue or cancel the take-off and the second speed representing a rotation speed from which the take-off must begin.

This gives the crew accurate visual indications for anticipating take-off or non-take-off actions and the precise moments when to begin to pull on the stick to make the aircraft take off.

Advantageously, during a landing phase, the interface is intended to display, in addition to the runway straight line and the deviation indicators described previously, an image comprising a landing runway by marking, by a quadrilateral, a region of interest corresponding to the runway and the distance or the time to touchdown of the wheels, the size of the region of interest varies as a function of the distance so as to remain to scale with respect to the image of the landing runway.

This makes it possible to display the region of interest in a more appropriate and more intuitive manner with respect to the real image of the runway.

Advantageously, during a landing phase, the human-machine interface is intended to represent, during a landing phase, first and second deviation indicators on, respectively, a horizontal side and a vertical side of the graphic representation, the first and second deviation indicators respectively indicating the lateral and vertical deviations between the central longitudinal axis of the runway and the longitudinal axis of the aircraft. Moreover, the human-machine interface is intended to represent, during a take-off phase, a single lateral deviation indicator on a horizontal side of the graphic representation, the lateral deviation indicator indicating the lateral deviation between the central longitudinal axis of the runway and the longitudinal axis of the aircraft.

This allows for an intuitive reading of the lateral and vertical deviations.

Advantageously, the human-machine interface is intended to display additional deviation indicators based on another measurement source of ILS or GLS type.

This is an option that, if necessary, allows the crew to see if there is any conflict between the two sources, in which case the automatic pilot is configured to continue on other modes and, possibly, switch over to manual mode.

The disclosure herein also targets a system for assisting in the take-off or the landing of an aircraft, comprising:

an imaging device embedded onboard the aircraft and intended to take a stream of images of the ground, image analysis and processing modules for detecting elements that are relevant for the take-off or the landing comprising the central longitudinal axis of a runway and for calculating deviation values between the longitudinal axis of the aircraft and the central longitudinal axis of the runway, and a human-machine interface according to any one of the preceding features.

The disclosure herein also targets a representation method on a human-machine interface in an aircraft, comprising the following steps:

displaying a graphic representation for assisting in the take-off or the landing of the aircraft, representing, on the graphic representation, indicators based on a processing of a stream of images taken by embedded cameras and on avionics data from avionics systems of the aircraft, the indicators comprising a representation of a runway straight line indicative of the central longitudinal axis of the runway and of at least one deviation indicator, calculated from processing of the stream of images and the avionics data, representative of the difference between the longitudinal axis of the aircraft and the central longitudinal axis of the runway.

BRIEF DESCRIPTION OF THE DRAWINGS

Other features and advantages of the disclosure herein will become apparent on reading of a preferential embodiment of the disclosure herein in relation to the following figures:

FIG. 2 schematically illustrates a human-machine interface representing confidence intervals associated with a deviation indicator, according to a preferred embodiment of the disclosure herein;

FIGS. 4A and 4B schematically illustrate graphic representations during a take-off phase, according to an embodiment of the disclosure herein.

DETAILED DESCRIPTION

The concept on which the disclosure herein is based is a human-machine interface that makes it possible to display an intuitive and accurate graphic representation for assisting in take-off or landing based on a fully autonomous system essentially using only images captured by embedded cameras and, possibly, avionics data already available.

Figure 1:
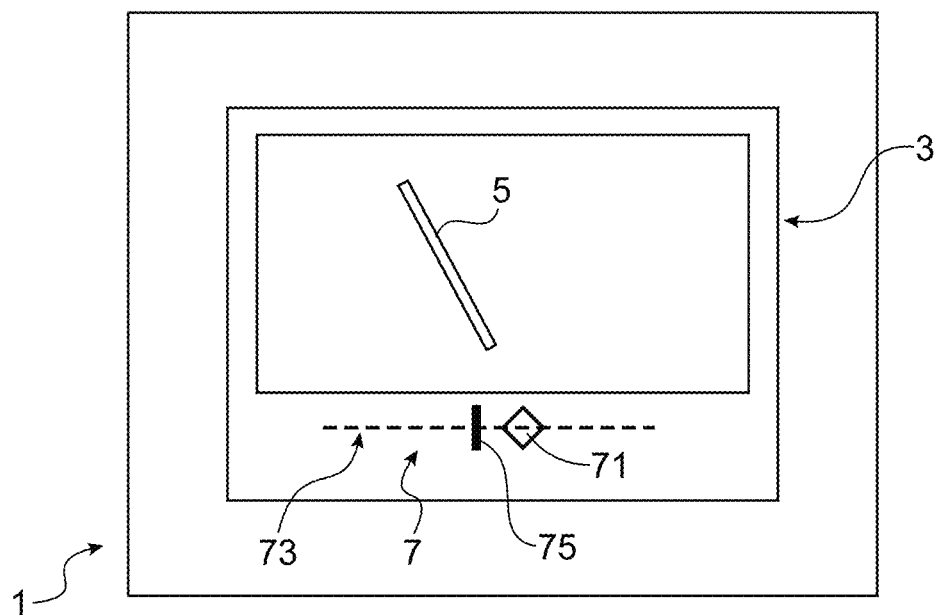
FIG. 1 schematically illustrates a human-machine interface for assisting in the piloting of an aircraft in the take-off or landing phase, according to an embodiment of the disclosure herein.

FIG. 1 schematically illustrates a human-machine interface for assisting in the piloting of an aircraft in the take-off or landing phase, according to an embodiment of the disclosure herein.

The human-machine interface 1 usually comprises a display device and a sound signalling device. In accordance with the disclosure herein, the human-machine interface 1 is intended to display a graphic representation 3 (image) for assisting in the take-off of an aircraft from a runway or in the landing of the aircraft on a runway. The graphic representation 3 comprises indicators based singularly on a processing of a stream of images of the ground taken by cameras embedded in the aircraft and on avionics data from avionics systems of the aircraft. These indicators comprise a representation of a runway straight line 5 indicative of the central longitudinal axis of the runway and of at least one deviation indicator 7 representative of the difference between the longitudinal axis of the aircraft and the central longitudinal axis of the runway represented by the runway straight line 5. The deviation indicator 7 is calculated from processing of the stream of images and the avionics data.

It will be noted that the human-machine interface 1 is configured to adapt the graphic representation 3 according to whether the aircraft is in take-off or landing phase. For example, in take-off phase, the graphic representation 3 comprises a representation of a runway straight line 5 indicative of the central longitudinal axis of the runway, an aircraft straight line indicative of the longitudinal axis of the aircraft, and a single deviation indicator indicating the lateral deviation between the central longitudinal axis of the runway and the longitudinal axis of the aircraft, and other indications (see FIGS. 4A and 4B).

Figure 5:
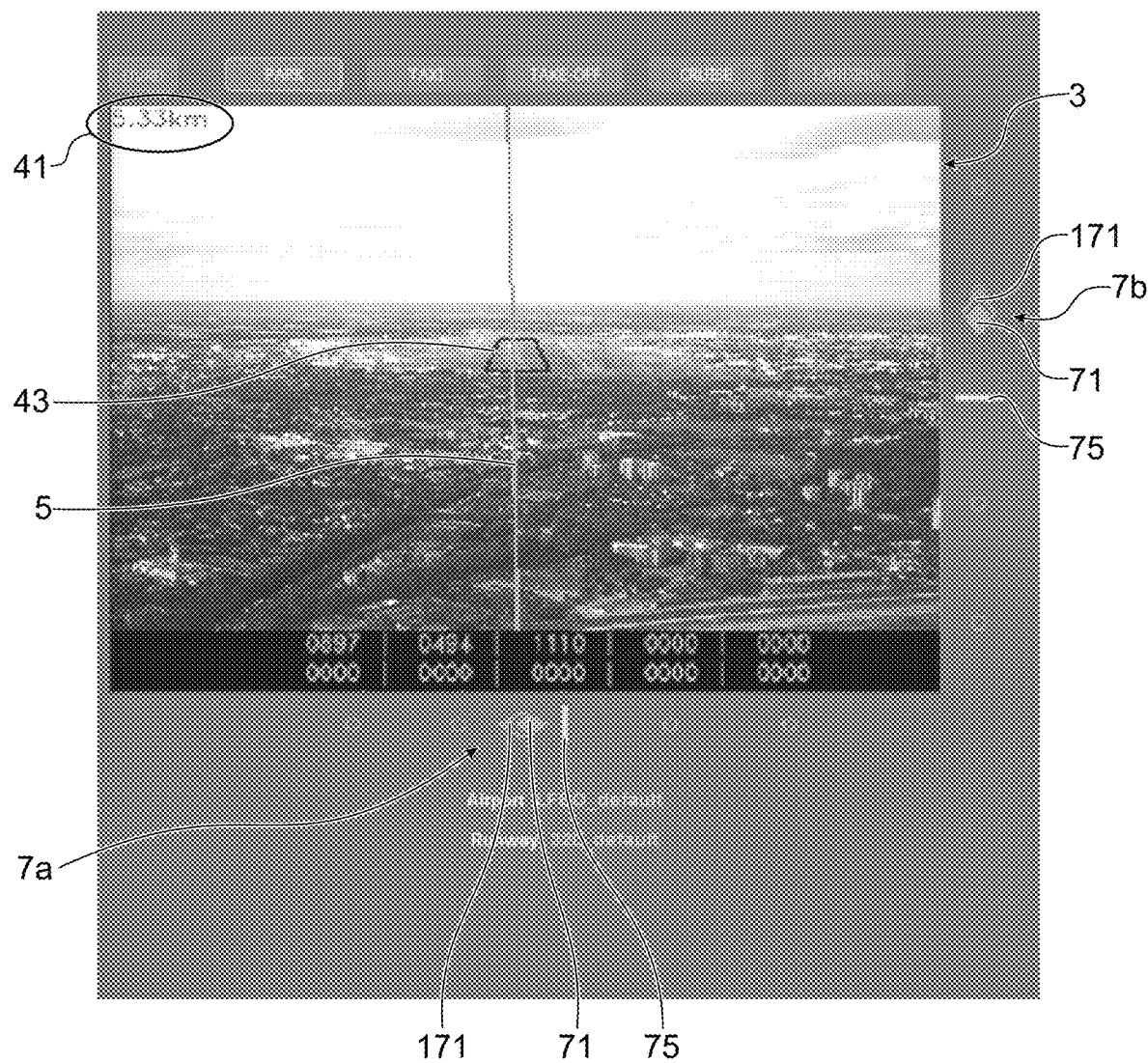
FIG. 5 schematically illustrates a graphic representation during a landing phase, according to an embodiment of the disclosure herein.

In landing phase, the graphic representation 3 comprises an image comprising a region of interest corresponding to the landing runway, a representation of a runway straight line 5 indicative of the central longitudinal axis of the runway, and two deviation indicators respectively indicating the lateral and vertical deviations between the central longitudinal axis of the runway and the longitudinal axis of the aircraft, and other indications (see FIG. 5).

Each deviation indicator 7 is represented by a pointer 71 moving along a one-dimensional reference frame 73 whose origin 75 is linked to the position of the aircraft. The position of the pointer 71 with respect to the origin 75 of the reference frame indicates the difference between the central longitudinal axis of the runway and the longitudinal axis of the aircraft. The pointer 71 advantageously has a geometrical form exhibiting vertical and horizontal symmetries, for example, a square, a rectangle, a rhomb, a circle, etc. The vertical axis of symmetry of the geometrical figure indicates the measured value of the deviation.

Advantageously, the human-machine interface 1 is intended to also represent at least one confidence interval bracketing the measured value of the deviation indicated by the pointer.

A first confidence interval can be defined by the form of the geometrical figure of the pointer. In fact, the first confidence interval can correspond to the length of the segment merged with the horizontal axis of symmetry and linking two points of the geometrical figure.

As an example, the confidence intervals are determined from levels of accuracy of the image processing processes and/or the filtering techniques associated with the merging of data between the images and inertial data.

FIG. 2 schematically illustrates a graphic representation representing confidence intervals associated with a deviation indicator, according to a preferred embodiment of the disclosure herein.

According to this example, the scale of the one-dimensional reference frame is represented by dots 76 or small circles and its origin 75 is marked by a small line orthogonal to the axis of the reference frame and represented in a first color. The geometrical figure of the pointer is represented by a rhomb of a second color distinct from that of the line. For example, the line 75 is represented in yellow while the rhomb 71 is represented in green or violet. Thus, the rhomb 71 moves along the axis of the one-dimensional reference frame such that the difference between the position of its vertical diagonal and the origin 75 (i.e. the line) indicates the measured value of the deviation. In particular, the longitudinal axes of the runway and of the aircraft are considered to be sufficiently aligned when the line 75 is located within the rhomb 71. Furthermore, the length of the horizontal diagonal of the rhomb represents a first, reference confidence interval associated with one times the standard deviation.

Advantageously, the human-machine interface is intended to also display a second confidence interval 77, associated with two times the standard deviation. Furthermore, the human-machine interface can display a third confidence interval 78, associated with three times the standard deviation.

According to this example, the second and third confidence intervals 77, 78 are depicted by bracketing symbols represented by an opening chevron and a closing chevron around the rhomb.

It will be noted that the bracketing symbols of the second confidence interval 77 can be represented by the same forms or forms different from those of the third interval 78. For example, the third interval 78 can be represented by an opening double chevron and a closing double chevron. As a variant, the bracketing symbols can be represented by left and right parentheses, left and right square brackets, etc. It will also be noted that the bracketing symbols of the second and third confidence intervals 77, 78 are represented in the same color as that of the rhomb. As a variant, they can be represented in different colors.

Advantageously, the human-machine interface is intended to emit an alert signal in the case where the deviation is excessive, that is to say when it is greater than a predetermined deviation threshold. The value of the predetermined deviation threshold can be chosen as a function of the width of the runway and of the characteristics of the aircraft, in particular its dimensions and the positions of the landing gears.

The alert signal can be in the form of an audible signal, and/or a blinking of the pointer (rhomb), and/or a blinking of the symbols bracketing the confidence intervals and/or a change to the geometrical form or the color of the pointer or of the confidence interval bracketing symbols, and/or a written message.

Figure 3:
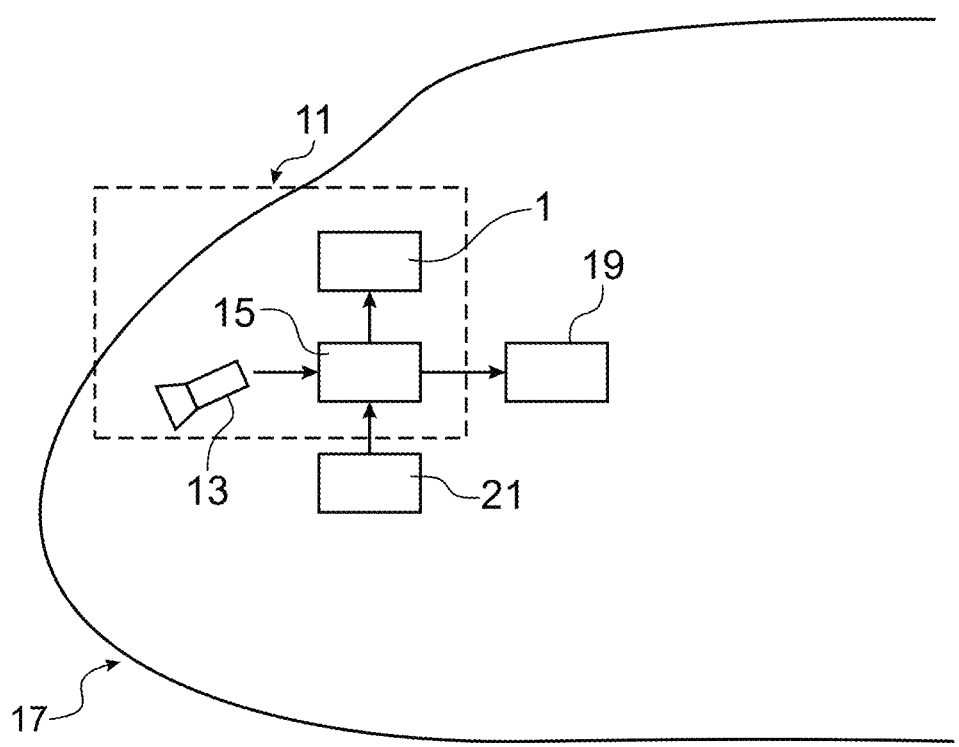
FIG. 3 schematically illustrates a system for assisting in the take-off or automatic landing of an aircraft, according to an embodiment of the disclosure herein.

FIG. 3 schematically illustrates a system for assisting in the take-off or in the automatic landing of an aircraft, according to an embodiment of the disclosure herein.

System for assisting in take-off or automatic landing should be understood to mean both a system allowing the aircraft to take off or land without the intervention of the pilot and a system guiding or assisting the pilot in his manoeuvres. In particular, the pilot will at any moment be able to switch back to manual mode.

This assistance system 11 comprises an imaging device 13, data analysis and image processing modules 15, and a human-machine interface 1.

The imaging device 13 is embedded onboard the aircraft 17 and comprises at least one system of cameras mounted in the vertical plane of symmetry of the aircraft and is designed to take a stream of images of the ground. The system of cameras can advantageously be an EVS (Enhanced Vision System) system equipping most aircrafts of recent construction. This system is generally composed of a plurality of sensors (IR/visible cameras, millimetric radar, etc.) capable of providing the pilot with images of the ground in all conditions including conditions of reduced visibility.

The image analysis and processing modules 15 receive avionics data and the successive images taken by the imaging device 13 and process them to detect relevant elements therein and calculate deviations for the take-off or the landing. This processing can be performed by an image processing and data analysis technique described in the international application WO2014/075657 and in the French applications FR3024127 and FR3044807.

The image analysis and processing modules 15 are linked at the input to avionics systems 21 comprising an inertial unit and a flight management system of FMS type, and, at the output, to a flight controls computer 19 of the aircraft and to the human-machine interface 1 described previously.

More particularly, the analysis and processing modules 15 are configured to mix the video stream received from the imaging device 13 with data produced by the avionics systems 21 such as relative positioning data such as those produced by the inertial unit of the aircraft.

For example, to detect the presence of a landing runway and determine the region of interest, the image analysis and processing modules 15 use, in a first step, a horizontal differentiator filtering to determine the edges of the runway and, in a second step, a correlation, line by line, of the image thus filtered with the symmetrics of this image (with respect to its median axis). In all cases, the processing makes it possible to identify, by using, for example, the technique known as Hough transform, the edges of the landing runway and its central longitudinal axis as represented in FIG. 5.

Furthermore, the image analysis and processing modules 15 are configured to calculate, at each instant, an estimation of the lateral deviation (in take-off or landing phase) and longitudinal deviation (in landing phase) between the central longitudinal axis of the runway and the longitudinal axis of the aircraft. The calculation of the deviations is based on a process of merging data (geometric coordinates of straight lines detected by an image analysis algorithm merged with the inertial data).

The image analysis and processing modules 15 are configured also to determine confidence intervals from the levels of accuracy of the images and data and the processes involved in processing these images and data.

For example, the image processing algorithm which performs the detection of the runway or of the central line of the runway is not necessarily 100% reliable and traces a certain confidence value to a data merging system. This value can be used to vary the representation of the confidence interval and to activate a disengagement system if the value is too low. In fact, the analysis and processing modules 15 compare the deviation values with predetermined deviation thresholds and order the signalling of the alert and/or the activation of the disengagement system if this difference is greater than the threshold.

According to another example, the outputs of the image processing algorithm being merged with other data (inertial type data) to estimate the position of the aircraft, the result of this estimation (produced, for example, using a Kalman filter) presents a certain level of accuracy (covariance of the position prediction error). This information can be used directly to represent the confidence in the calculation of the positioning.

The image analysis and processing modules 15 are also configured to calculate the remaining length of the runway, in order to adapt, for example, the braking power of the aircraft. Likewise, in landing phase, they calculate the distance or the time to touchdown of the wheels.

Advantageously, the analysis and processing modules 15 are configured to calculate, in take-off phase, the location on the central runway straight line of the points corresponding to the speed of decision to continue or cancel the take-off and the rotation speed from which the take-off must begin.

Figure 4B:
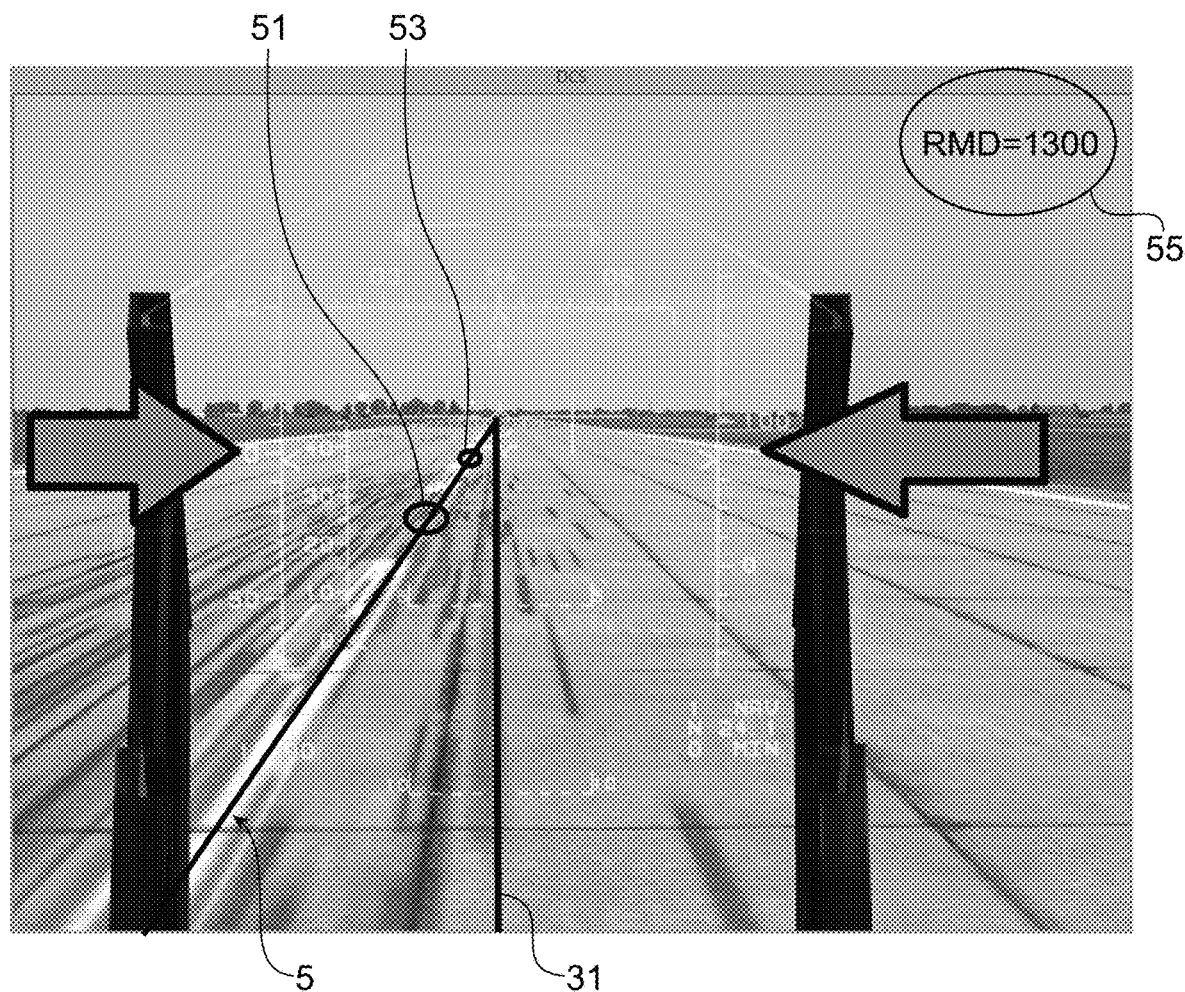

FIGS. 4A and 4B schematically illustrate graphic representations during a take-off phase, according to an embodiment of the disclosure herein.

More particularly, the graphic representation of FIG. 4A comprises an image of the runway and the representation of a runway straight line 5 indicative of the central longitudinal axis of the runway.

It will be noted that, in what is called an "initialization mode", the runway straight line 5 can be represented by an initialization straight line in dotted line for example in a first color before switching to "operational mode" in a solid line straight line in the same first color or in a second color. For example, the initialization straight line can be in yellow and the operational straight line 5 in green.

The crew then checks that, at the end of the initialization mode, the runway straight line 5 is green, in the right position and stabilized for a period of a few seconds. If everything is conformal, the crew will then activate the start of the take-off operation. Obviously, the crew continues to monitor the behavior of the automatic system on the human-machine interface 1 in order to take over control if necessary.

Furthermore, the automatic system is configured to self-monitor and a flag will appear if it is defective. Reversals will be made either automatically or manually, to other automatic means (ILS, GLS, etc.) or to manual piloting.

Furthermore, the graphic representation of FIG. 4A comprises an aircraft straight line 31 superimposed on the image of the runway, indicative of the longitudinal axis of the aircraft. The graphic representation also comprises the remaining distance of the runway. Advantageously, the aircraft 31 and runway 5 straight lines indicative of the longitudinal axes of the aircraft and of the runway are represented by two distinct colors, for example, the aircraft straight line 31 is in yellow and the runway straight line 5 is in green.

Furthermore, FIG. 4A shows a lateral deviation indicator 7 on a horizontal side of the graphic representation (for example the bottom side of the graphic representation). As described previously, the deviation indicator 7 comprises a pointer 71 here in the form of a green rhomb, moving rectilinearly with respect to the line 75, for example of yellow color, representing the position of the aircraft. In this example, the line 75 is located within the rhomb 71 indicating that the longitudinal axis of the aircraft is indeed parallel to the longitudinal axis of the runway. This example also shows the display of an additional deviation indicator (here represented by a second rhomb 171, for example in violet) based on another measurement source of ILS or GLS type. This is an option that allows, if necessary, the crew to see if there is a conflict between the two sources, in which case the flight controls computer 19 is configured to continue on other modes and possibly to switch over to manual mode.

Furthermore, the human-machine interface 1 is intended to mark, on the runway straight line 5, first and second markers 51, 53 (for example in the form of dots or small circles) where the aircraft is planned to reach first and second characteristic speeds, as illustrated in FIG. 4B. The first marker 51 corresponds to the speed of decision to continue or cancel the take-off. The second marker 53 corresponds to a rotation speed from which the take-off must begin by pulling on the stick. Moreover, the human-machine interface 1 indicates the remaining distance of the runway 55 thus giving, in case of braking, relevant indications based on the characteristics of the aircraft (weight, aerodynamic resistance of the surfaces and of the wind) and on its speed.

FIG. 5 schematically illustrates a graphic representation during a landing phase, according to an embodiment of the disclosure herein.

The landing graphic representation begins to be implemented when the altitude of the aircraft goes below a first predetermined height threshold, for example 3500 feet AGL (approximately 1067 meters). The landing phase enters into the "initialization mode", during which the GPS is used for this purpose and the landing system based on the embedded cameras enters into initialization mode. It will be noted that the analysis and processing modules 15 estimate the point of touchdown and the landing distance as a function of parameters relating to the current situation of the aircraft.

When the current distance of the aircraft with respect to a threshold of the landing runway goes below a second predetermined distance threshold, for example 4.3 NM (approximately 8000 meters), the landing system based on the cameras stops using the GPS information and switches to operational mode. That is the moment when the automatic landing function is activated and kept active until the end of deployment, During all these phases, the deviations are monitored visually by the crew using the human-machine interface 1.

More particularly, the graphic representation of FIG. 5 displayed by the human-machine interface 1 comprises an indication 41 of the distance and/or time to the touchdown of the wheels and the display of an image comprising a region of interest 43 represented by a quadrilateral (for example a parallelogram) surrounding a landing runway. Advantageously, the size of the region of interest 43 varies as a function of the distance so as to remain to scale with respect to the image of the landing runway. In fact, the current size of the region of interest 43 is determined inversely proportionally to the current distance of the aircraft with respect to the threshold of the landing runway.

Furthermore, the graphic representation of FIG. 5 comprises first and second deviation indicators 7a, 7b respectively on a horizontal side (for example at the bottom) and a vertical side (for example on the right) of the graphic representation 3. The first and second deviation indicators 7a, 7b respectively indicate the lateral and vertical deviations between the central longitudinal axis of the runway and the longitudinal axis of the aircraft.

As described previously, each deviation indicator 7a, 7b comprises a rhomb 71 in green moving with respect to a yellow line 75 representing the position of the aircraft. This example also shows the display of two other deviation indicators (represented by rhombs 171, for example in violet) based on another measurement source of ILS or GLS type.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A human-machine interface in an aircraft,
wherein the human-machine interface is configured to display a graphic representation for assisting in take-off or landing of the aircraft;
wherein the graphic representation comprises indicators, the indicators comprising:
a representation of a runway straight line that is indicative of a central longitudinal axis of a runway; and
at least one deviation indicator, wherein the at least one deviation indicator:
is calculated from a processing of a stream of images taken by embedded cameras and of avionics data from avionics systems of the aircraft; and
is representative of a difference between a longitudinal axis of the aircraft and the central longitudinal axis of the runway; and
is represented by a pointer moving along a one-dimensional reference frame having an origin that is linked to a position of the aircraft,
wherein the difference between the central longitudinal axis of the runway and the longitudinal axis of the aircraft is indicated by a position of the pointer; and
wherein the human-machine interface is configured to display, on the graphic representation, at least one confidence interval bracketing a measured value of the difference indicated by the pointer.

2. The human-machine interface according to claim 1, wherein:
the origin of the one-dimensional reference frame is marked by a line of a first color; and
the pointer is represented by a geometrical figure of a second color distinct from that of the line, a vertical axis of symmetry of the geometrical figure:
indicating the measured value of the at least one deviation indicator and a length of a segment merged with a horizontal axis of symmetry; and
linking two points of the geometrical figure representing a first confidence interval, which is a reference confidence interval and is associated with one times a standard deviation; and the human-machine interface represents:
a second confidence interval that is associated with two times the standard deviation and is represented by bracketing symbols around the geometrical figure; and/or
a third confidence interval that is associated with three times the standard deviation and is represented by bracketing symbols around the second confidence interval.

3. The human-machine interface according to claim 2, wherein the bracketing symbols of the second and third confidence intervals are represented by a same or different forms selected from the group consisting of: an opening chevron and a closing chevron, an opening double chevron and a closing double chevron, left and right parentheses, and left and right square brackets, and wherein the bracketing symbols have a same color or have different colors.

4. The human-machine interface according to claim 1, wherein the human-machine interface is configured to issue an alert signal when the difference is greater than a predetermined threshold, the alert signal corresponding to at least one of an audible signal, a blinking of the pointer, a change in a geometrical form of the pointer, a change of a color of the pointer, and a written message.

5. The human-machine interface according to claim 1, wherein, during a take-off phase, the human-machine interface is configured to display an image of the runway and, superimposed on the image of the runway, an aircraft straight line indicative of the longitudinal axis of the aircraft and a remaining distance of the runway, wherein the aircraft and runway straight lines indicative of the longitudinal axes of the aircraft and of the runway, respectively, are represented by two distinct colors.

6. The human-machine interface according to claim 1, wherein, during a take-off phase, the human-machine interface is configured to mark, on an image of the runway, straight line first and second markers where the aircraft is planned to reach first and second characteristic speeds, respectively, the first speed representing a speed of a decision to continue or cancel take-off and the second speed representing a speed at which the take-off must begin.

7. The human-machine interface according to claim 1, wherein, during a landing phase, the human-machine interface is configured to display:
an image comprising a landing runway by marking a quadrilateral a region of interest corresponding to the runway; and
an indication of distance or time to touchdown of the wheels;
wherein a size of the region of interest varies as a function of the distance so as to remain to scale with respect to the image comprising the landing runway.

8. The human-machine interface according to claim 1, wherein:
the human-machine interface is configured to represent, during a landing phase, first and second deviation indicators on a horizontal side and a vertical side, respectively, of the graphic representation, the first and second deviation indicators respectively indicating lateral and vertical deviations between the central longitudinal axis of the runway and the longitudinal axis of the aircraft; and
the human-machine interface is configured to represent, during a take-off phase, a single lateral deviation indicator on a horizontal side of the graphic representation, the lateral deviation indicator indicating a lateral deviation between the central longitudinal axis of the runway and the longitudinal axis of the aircraft.

9. The human-machine interface according to claim 1, wherein the human-machine interface is configured to display additional deviation indicators based on another measurement source of ILS or GLS type.

10. A system for assisting in take-off or landing of an aircraft, the system comprising:
an imaging device embedded onboard the aircraft and configured to take a stream of images of the ground;
data analysis and image processing modules for detecting elements that are relevant for the take-off or the landing comprising a central longitudinal axis of a runway and for calculating deviation values between a longitudinal axis of the aircraft and the central longitudinal axis of the runway; and
a human-machine interface according to claim 1.

11. A method for displaying a graphic representation on a human-machine interface in an aircraft, the method comprising:
displaying the graphic representation for assisting in take-off or landing of the aircraft;
providing a stream of images taken by embedded cameras;
providing avionics data from avionics systems of the aircraft;
processing the stream of images and the avionics data to calculate at least one deviation indicator;
representing, on the graphic representation, indicators, the indicators comprising;
a representation of a runway straight line that is indicative of a central longitudinal axis of the runway; and
the at least one deviation indicator, wherein the at least one deviation indicator:
is representative of a difference between a longitudinal axis of the aircraft and the central longitudinal axis of the runway; and
is represented by a pointer moving along a one-dimensional reference frame having an origin that is linked to a position of the aircraft,
wherein the difference between the central longitudinal axis of the runway and the longitudinal axis of the aircraft is indicated by a position of the pointer; and
using the human-machine interface to display, on the graphic representation, at least one confidence interval bracketing a measured value of the at difference indicated by the pointer.

12. The method according to claim 11, wherein:
the origin of the one-dimensional reference frame is marked by a line of a first color; and
the pointer is represented by a geometrical figure of a second color distinct from that of the line, a vertical axis of symmetry of the geometrical figure:
indicating the measured value of the at least one deviation indicator and a length of a segment merged with a horizontal axis of symmetry; and
linking two points of the geometrical figure representing a first confidence interval, which is a reference confidence interval and is associated with one times a standard deviation;
the method comprising representing, on the human-machine interface:
a second confidence interval that is associated with two times the standard deviation and is represented by bracketing symbols around the geometrical figure; and/or a third confidence interval that is associated with three times the standard deviation and is represented by bracketing symbols around the second confidence interval.

13. The method according to claim 12, wherein the bracketing symbols of the second and third confidence intervals are represented by a same or different forms selected from the group consisting of: an opening chevron and a closing chevron, an opening double chevron and a closing double chevron, left and right parentheses, and left and right square brackets, and wherein the bracketing symbols have a same color or have different colors.

14. The method according to claim 11, comprising issuing, using the human-machine interface, an alert signal when the difference is greater than a predetermined threshold, the alert signal corresponding to at least one of an audible signal, a blinking of the pointer, a change in a geometrical form of the pointer, a change of a color of the pointer, and a written message.

15. The method according to claim 11, comprising, during a take-off phase:
    displaying, using the human-machine interface, an image of the runway and, superimposed on the image of the runway, an aircraft straight line indicative of the longitudinal axis of the aircraft and a remaining distance of the runway, wherein the aircraft and runway straight lines indicative of the longitudinal axes of the aircraft and of the runway, respectively, are represented by two distinct colors; and/or
    marking on the image of the runway, using the human-machine interface, straight line first and second markers where the aircraft is planned to reach first and second characteristic speeds, respectively, the first speed representing a speed of a decision to continue or cancel take-off and the second speed representing a speed at which the take-off must begin.

16. The method according to claim 11, comprising:
    displaying, during a landing phase and using the human-machine interface:
        an image comprising a landing runway by marking a quadrilateral a region of interest corresponding to the runway; and
        an indication of distance or time to touchdown of the wheels;
        wherein a size of the region of interest varies as a function of the distance so as to remain to scale with respect to the image comprising the landing runway; and/or
    representing, using the human-machine interface:
        during a landing phase, first and second deviation indicators on a horizontal side and a vertical side, respectively, of the graphic representation, the first and second deviation indicators respectively indicating lateral and vertical deviations between the central longitudinal axis of the runway and the longitudinal axis of the aircraft; and
        during a take-off phase, a single lateral deviation indicator on a horizontal side of the graphic representation, the lateral deviation indicator indicating a lateral deviation between the central longitudinal axis of the runway and the longitudinal axis of the aircraft.

17. The method according to claim 11, comprising displaying, using the human-machine interface, additional deviation indicators based on another measurement source of ILS or GLS type.

18. A human-machine interface in an aircraft,
    wherein the human-machine interface is configured to display a graphic representation for assisting in take-off or landing of the aircraft;
    wherein the graphic representation comprises indicators, the indicators comprising:
        a representation of a runway straight line that is indicative of a central longitudinal axis of a runway; and
        at least one deviation indicator, wherein the at least one deviation indicator:
            is calculated from a processing of a stream of images taken by embedded cameras and of avionics data from avionics systems of the aircraft; and
            is representative of a difference between a longitudinal axis of the aircraft and the central longitudinal axis of the runway; and
    wherein:
        during a take-off phase:
            the human-machine interface is configured to display an image of the runway and, superimposed on the image of the runway, an aircraft straight line indicative of the longitudinal axis of the aircraft and a remaining distance of the runway, wherein the aircraft and runway straight lines indicative of the longitudinal axes of the aircraft and of the runway, respectively, are represented by two distinct colors; and/or
            the human-machine interface is configured to mark, on the image of the runway, straight line first and second markers where the aircraft is planned to reach first and second characteristic speeds, respectively, the first speed representing a speed of a decision to continue or cancel take-off and the second speed representing a speed at which the take-off must begin; and/or
        the human-machine interface is configured to represent:
            during a landing phase, first and second deviation indicators on a horizontal side and a vertical side, respectively, of the graphic representation, the first and second deviation indicators respectively indicating lateral and vertical deviations between the central longitudinal axis of the runway and the longitudinal axis of the aircraft; and
            during a take-off phase, a single lateral deviation indicator on a horizontal side of the graphic representation, the lateral deviation indicator indicating a lateral deviation between the central longitudinal axis of the runway and the longitudinal axis of the aircraft.

19. The human-machine interface according to claim 18, wherein:
    the human-machine interface is configured to issue an alert signal when the difference is greater than a predetermined threshold, the alert signal corresponding to at least one of an audible signal, a blinking of the pointer, a change in a geometrical form of the pointer, a change of a color of the pointer, and a written message; and/or
    during a landing phase, the human-machine interface is configured to display:
        an image comprising a landing runway by marking a quadrilateral a region of interest corresponding to the runway; and
        an indication of distance or time to touchdown of the wheels;

wherein a size of the region of interest varies as a function of the distance so as to remain to scale with respect to the image comprising the landing runway; and/or the human-machine interface is configured to display additional deviation indicators based on another measurement source of ILS or GLS type.

20. A system for assisting in take-off or landing of an aircraft, the system comprising:
an imaging device embedded onboard the aircraft and configured to take a stream of images of the ground;
data analysis and image processing modules for detecting elements that are relevant for the take-off or the landing comprising a central longitudinal axis of a runway and for calculating deviation values between a longitudinal axis of the aircraft and the central longitudinal axis of the runway; and
a human-machine interface according to claim 18.

* * * * *